(12) United States Patent
Erdman et al.

(10) Patent No.: US 9,879,575 B2
(45) Date of Patent: Jan. 30, 2018

(54) SYSTEM FOR LUBRICATING VALVE ASSEMBLY OF ENGINE

(71) Applicant: Caterpillar Inc., Peoria, IL (US)

(72) Inventors: Douglas D. Erdman, Rossville, IN (US); Michael D. Roley, Washington, IL (US); Rong Qu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 15/176,856

(22) Filed: Jun. 8, 2016

(65) Prior Publication Data

US 2016/0281550 A1 Sep. 29, 2016

(51) Int. Cl.
| | |
|---|---|
| *F01L 3/12* | (2006.01) |
| *F16K 1/12* | (2006.01) |
| *F01M 11/02* | (2006.01) |
| *F01L 3/08* | (2006.01) |
| *F01M 9/10* | (2006.01) |

(52) U.S. Cl.
CPC .................. *F01L 3/12* (2013.01); *F01L 3/08* (2013.01); *F01M 9/103* (2013.01); *F01M 11/02* (2013.01); *F16K 1/12* (2013.01); *F01L 2810/02* (2013.01)

(58) Field of Classification Search
CPC ........... F01L 3/12; F01L 3/08; F01L 2810/02; F01M 9/103; F01M 11/02; F16K 1/12
USPC ............................. 251/355; 123/90.22, 90.33
See application file for complete search history.

(56) References Cited

U.S. PATENT DOCUMENTS

| | | | | |
|---|---|---|---|---|
| 1,370,346 | A | * | 3/1921 | Nelson .................. F01M 9/103 123/188.6 |
| 3,179,094 | A | * | 4/1965 | Ribeton ................ F01L 1/2411 123/90.36 |
| 4,245,523 | A | * | 1/1981 | Wherry ................... F01L 1/181 123/90.36 |
| 4,677,723 | A | * | 7/1987 | Greene, Sr. ........... F01L 1/2411 123/90.22 |
| 4,924,821 | A | | 5/1990 | Teerman |
| 5,623,899 | A | * | 4/1997 | Wolf ...................... F01M 9/103 123/90.36 |
| 5,626,110 | A | * | 5/1997 | Regueiro ................ F01L 1/143 123/90.22 |
| 5,662,078 | A | * | 9/1997 | Adegawa .................. F01L 3/04 123/188.3 |

(Continued)

FOREIGN PATENT DOCUMENTS

| CN | 202926413 | 5/2013 |
|---|---|---|
| CN | 203559947 | 4/2014 |

(Continued)

*Primary Examiner* — John Bastianelli

(57) ABSTRACT

A system for lubricating a valve assembly of an engine. The system includes a valve bridge having a base portion is disposed on a guide rod. The guide rod is received within a hole defined in the base portion of the valve bridge to define a chamber and to receive lubricant in the chamber. The valve bridge includes an arm that is engaged with a valve stem. The valve bridge includes a passage in fluidly communicating with the chamber and an end of the arm. The system includes a valve disposed around the valve stem and valve stem guide. The valve seal includes a lip member that abuts an outer surface of the valve stem to control a flow of the lubricant from the passage to a gap defined between the valve stem and the valve stem guide.

1 Claim, 5 Drawing Sheets

(56) References Cited

U.S. PATENT DOCUMENTS

| | | | | |
|---|---|---|---|---|
| 6,032,627 | A  * | 3/2000 | Brogdon | F01L 1/18 |
| | | | | 123/90.22 |
| 6,397,806 | B2 * | 6/2002 | Imai | F01L 1/143 |
| | | | | 123/196 M |
| 7,905,208 | B2 | 3/2011 | Ruggiero et al. | |
| 7,984,705 | B2 * | 7/2011 | Yang | F01L 1/08 |
| | | | | 123/321 |
| 2012/0132162 | A1 * | 5/2012 | Yoon | F01L 1/181 |
| | | | | 123/90.16 |
| 2015/0021508 | A1 * | 1/2015 | Nair | F01L 1/2411 |
| | | | | 251/366 |

FOREIGN PATENT DOCUMENTS

| | | |
|---|---|---|
| JP | 0828233 | 1/1996 |
| KR | 200178410 | 5/2000 |

* cited by examiner

SYSTEM FOR LUBRICATING VALVE ASSEMBLY OF ENGINE

TECHNICAL FIELD

The present disclosure relates to a valve assembly of an engine and more particularly relates to a system for lubricating the valve assembly of the engine.

BACKGROUND

An internal combustion engine, such as a diesel engine, a gasoline engine, or a natural gas engine, typically includes a cylinder block for defining cylinders and a cylinder head mounted on the cylinder block. The cylinders include intake and exhaust valves that are supported by valve guides provided in the cylinder head. The intake and exhaust valves are actuated to be in open and closed position by a push rod and a rocker arm arrangement. The intake and exhaust valves are lubricated between the valve guides to prevent wear of the valves. However, unexpected increase of intake manifold pressure may reduce an amount of lubricant entering the valve guides. Such reduced amount of lubricant may not be sufficient to provide adequate lubrication for the intake and exhaust valves. Over a period of operation of the engine, undesired wear of the valve guides and/or the intake and exhaust valves may occur, effecting desired operating performance of the engine and potentially leading to premature failure of components of the engine.

China Patent Number 203,559,947 hereinafter referred as '947 patent, describes a Self-oscillation valve bridge arm component with cooling capacity. The self-oscillation valve bridge arm includes a cooling capacity that relates to a valve combination mechanism of a diesel engine. Through lubricating oil channels are formed inside parts of an intake and exhaust bridge arm components, an intake and an exhaust bridge arm and an intake and an exhaust valves. An end face of a valve rod and a bridge arm ball that can be lubricated and a cooling effect on the parts can be realized, so that the working reliability of the mechanism is improved. However, the '947 patent does not provide a lubrication system that may provide sufficient lubrication to the intake and exhaust valve at any operating condition of the engine.

SUMMARY OF THE DISCLOSURE

In one aspect of the present disclosure, a system for lubricating a valve assembly of an engine is provided. The engine includes a cylinder head to slidably receive a valve stem. The system includes a valve bridge. The valve bridge includes a base portion that defines a chamber to receive a lubricant. The valve bridge further includes at least one arm extending radially from the base portion. The at least one arm includes an end adapted to engage with the at least one valve stem. The valve bridge further includes a passage in fluid communication with the chamber and adapted to supply the lubricant to an outer surface of the valve stem. The system further includes a valve disposed around the valve stem and the valve stem guide. The valve stem is adapted to control a flow of the lubricant from the passage to a gap defined between the valve stem and the valve stem guide.

In another aspect of the present disclosure, a valve bridge of a valve assembly of an engine is provided. The valve bridge includes a base portion that defines a chamber. The valve bridge further includes at least one arm extending radially from the base portion. The at least one arm includes a first end and a second end. The first end is connected to the base portion and the second end is distal from the first end. The valve bridge further includes a passage having an inlet end in fluid communication with the chamber and an outlet end defined between the first end and the second end of the at least one arm.

DETAILED DESCRIPTION

Figure 1:
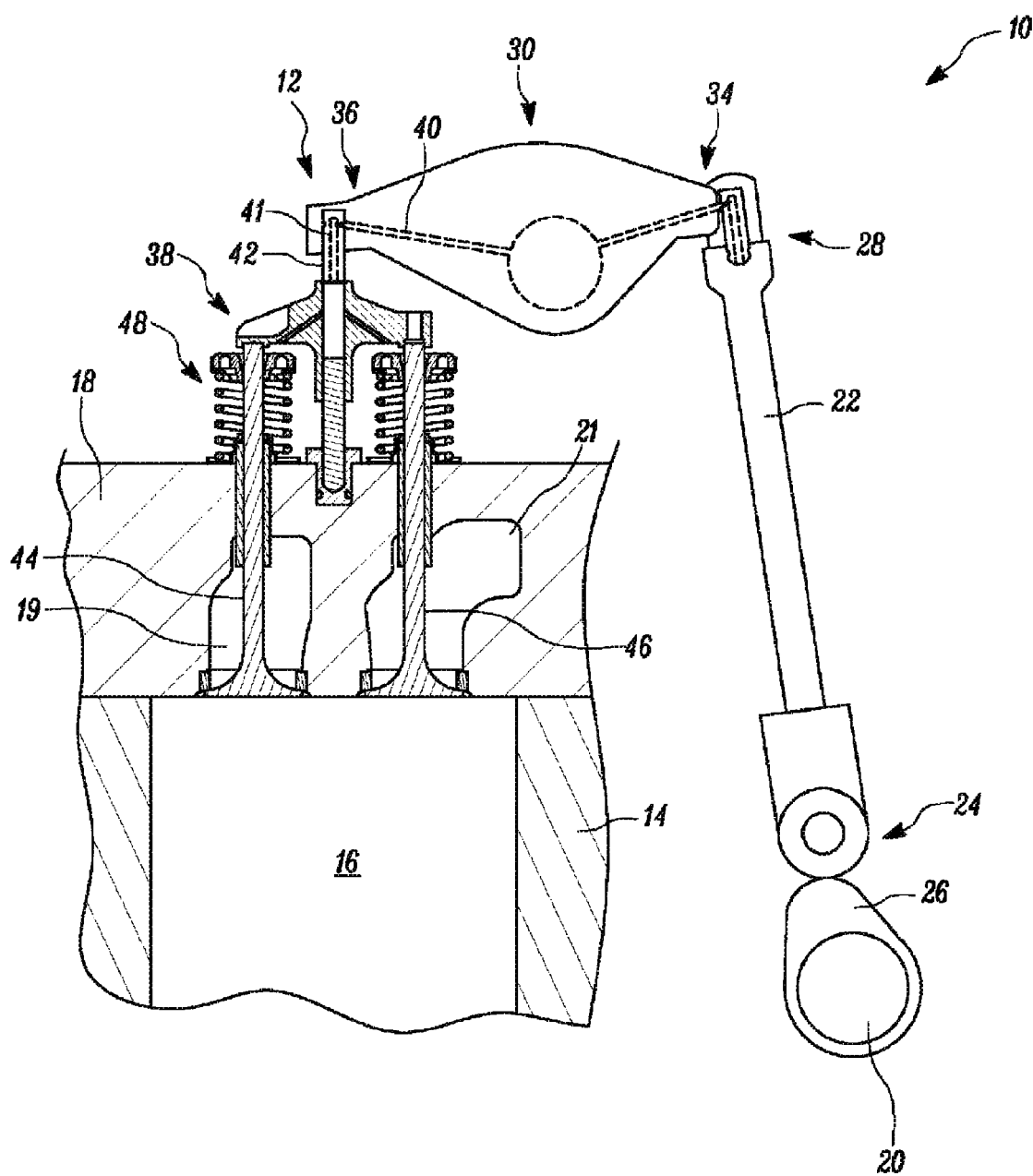
FIG. 1 is a partial cross-sectional view of an engine showing a valve assembly.

FIG. 1 is a partial cross-sectional view of an engine 10 having a valve assembly 12. The engine 10 may be of a single-cylinder engine or a multi cylinder engine. For illustration purpose of the present disclosure, one cylinder of the engine 10 is shown in FIG. 1. Further, the engine 10 may be one of an inline-type engine, or a v-type engine. The engine 10 may be used to power a machine associated with an industry including, but not limited to, transportation, construction, mining, agriculture, forestry, waste management and material handling. The engine 10 includes a cylinder block 14 defining a cylinder 16 therein. The engine 10 further includes a cylinder head 18 mounted on the cylinder block 14. The cylinder head 18 defines a pair of intake ports (not shown) and a pair of exhaust ports, individually referred to as a first exhaust port 19 and a second exhaust port 21. The first and second exhaust ports 19, 21 communicate with an exhaust manifold (not shown) to expel the exhaust gas from the cylinder 16 to atmosphere. The engine 10 further includes a camshaft 20 rotatably disposed within the cylinder block 14. The camshaft 20 is operably coupled with a crank shaft (not shown) of the engine 10 to receive a rotary power therefrom.

Each cylinder 16 of the engine 10, in case of multi cylinder engine, is associated with the valve assembly 12. One valve assembly 12 is described in detail for illustration purpose of the present embodiment. The valve assembly 12 includes a pushrod 22 having a first end 24 engaging with a lobe 26 of the camshaft 20 and a second end 28 coupling with a rocker arm 30. The rocker arm 30 is pivotally supported on the cylinder block 14 via a shaft (not shown). The rocker arm 30 includes a first end 34 coupled to the second end 28 of the pushrod 22. The pushrod 22 translates a rotational motion of the camshaft 20 to a pivotal motion of the rocker arm 30. The rocker arm 30 is provided with a passage 40. The passage 40 receives the lubricant from the shaft that further includes internal oil passages (not shown) therein. A second end 36 of the rocker arm 30 includes a plunger 42. The plunger 42 is further coupled with a valve bridge 38 and translates the pivotal motion of the rocker arm 30 to a linear motion of the valve bridge 38. Further, the plunger 42 is fluidly communicated to the rocker arm 30 by the passage 40 and is fluidly communicated to the valve bridge 38 by a passage 41.

The valve assembly 12 further includes a pair of intake valves (not shown) and a pair of exhaust valves, individually referred to as a first exhaust valve 44 and a second exhaust valve 46. The pair of intake valves may be actuated by another valve bridge (not shown) to selectively allow air to the cylinder 16. The first and second exhaust valves 44, 46 are engaged with the valve bridge 38 and disposed on the cylinder head 18 against a biasing force of a pair of coil springs 48. The pivotal motion of the rocker arm 30 causes the valve bridge 38 to move down, which in turn causes displacement of the first and second exhaust valves 44, 46 from the first and second exhaust ports 19, 21, respectively to exit the exhaust gas from the cylinder 16.

Figure 2:
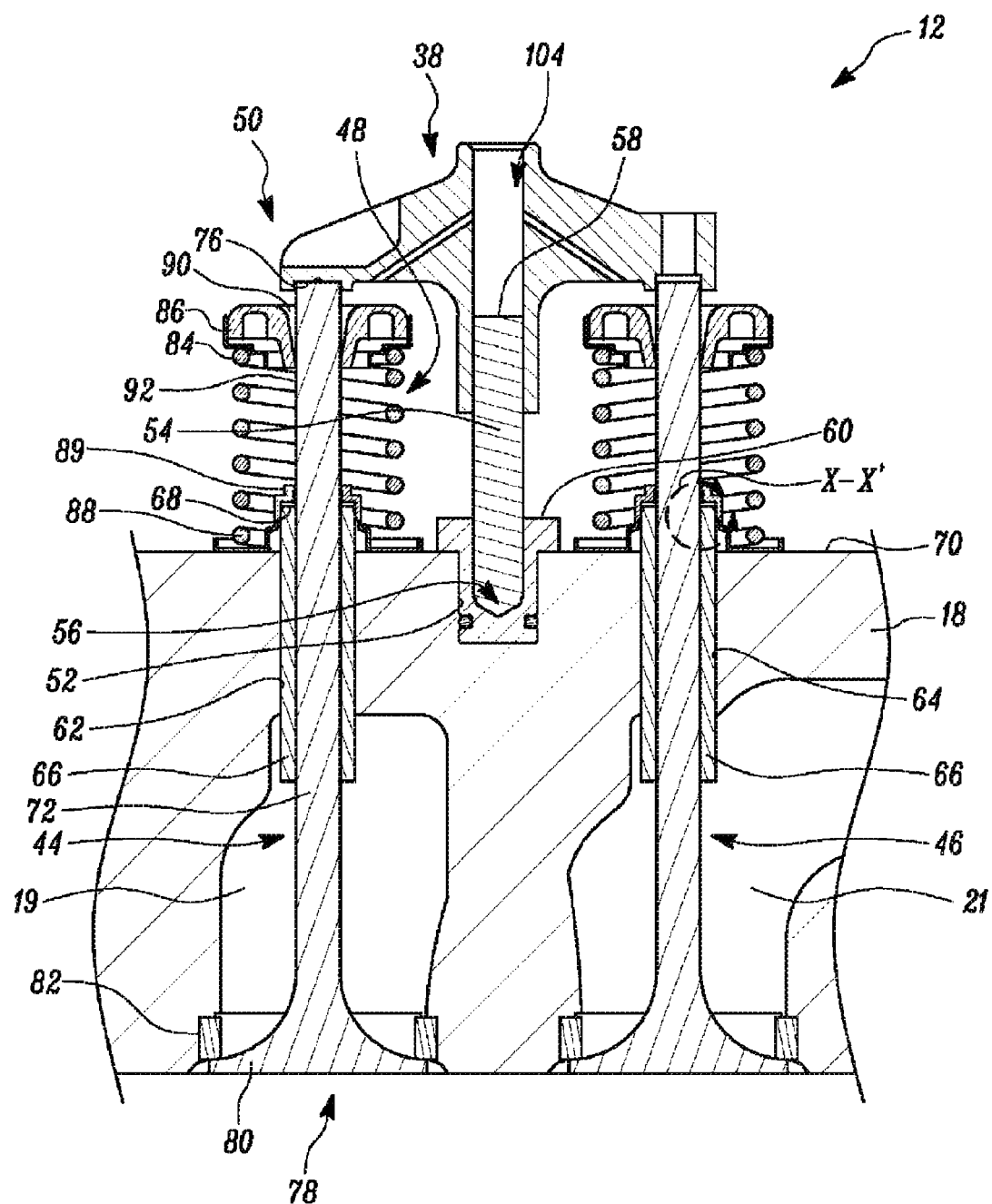
FIG. 2 is a cross-sectional view of a portion of an engine showing a system for lubricating the valve assembly, according to an embodiment of the present disclosure.

FIG. 2 illustrates a cross-sectional view of the valve assembly 12 showing a system 50 for lubricating the first and second exhaust valves 44, 46 of the valve assembly 12, according to an embodiment of the present disclosure. The cylinder head 18 includes a bore 52 for supporting a guide rod 54. The guide rod 54 includes a first end 56 and a second end 58. The first end 56 is received within the bore 52 such that the guide rod 54 is coaxial with the bore 52 and vertically disposed on the cylinder head 18. Specifically, the bore 52 includes a support member 60 to receive a portion of the first end 56 of the guide rod 54 and hence to mount the guide rod 54 with the cylinder head 18.

The cylinder head 18 further includes a pair of openings, individually referred to as a first opening 62 and a second opening 64. Each of the first and second openings 62, 64 is adapted to receive the first exhaust valve 44 and the second exhaust valve 46, respectively. The valve assembly 12 further includes a valve stem guide 66 partially received within each of the first and second openings 62, 64 such that an upper end 68 of the valve stem guide 66 protrudes from an upper surface 70 of the cylinder head 18, as shown. The cylinder head 18 may also include a pair of openings (not shown) and a pair of valve stem guides (not shown) similar to the first and second openings 62, 64 and the valve stem guide 66 for disposing the pair of intake valve. For illustration purpose of the present disclosure, the first exhaust valve 44 disposed in the first exhaust port 19 is described in detail. The first exhaust valve 44 includes a valve stem 72 slidably received through the valve stem guide 66 disposed in the first opening 62. The valve stem 72 includes a first end 76 coupled to the valve bridge 38 and a second end 78 includes a head portion 80. The head portion 80 operatively engages with a valve seat 82 defined in the first exhaust port 19 of the cylinder block 14, as shown, to control flow of the exhaust gas from the cylinder 16.

One of the pair of the coil spring 48 is received over the valve stem 72 of the first exhaust valve 44 and disposed between the cylinder head 18 and the valve bridge 38. The coil spring 48 is adapted to bias the valve stem 72 and hence to move the head portion 80 of the first exhaust valve 44 to a closed position. In the closed position, the head portion 80 of the first exhaust valve 44 is seated in the valve seat 82 of the first exhaust port 19. The coil spring 48 includes a first end 84 rested on a spring retainer 86 disposed adjacent to the valve bridge 38 and a second end 88 rested on a valve seal 89 disposed proximal to the cylinder head 18. The spring retainer 86 is slidably coupled with the valve stem 72 such that a cavity 90 is defined between an inner surface of the spring retainer 86 and an outer surface 92 of the valve stem 72. The valve seal 89 is disposed around the valve stem 72 and supported on the cylinder head 18. The valve seal 89, described in detail with reference to FIGS. 4 and 5, controls a flow of the lubricant to the valve stem 72 and the valve stem guide 66.

Figure 3:
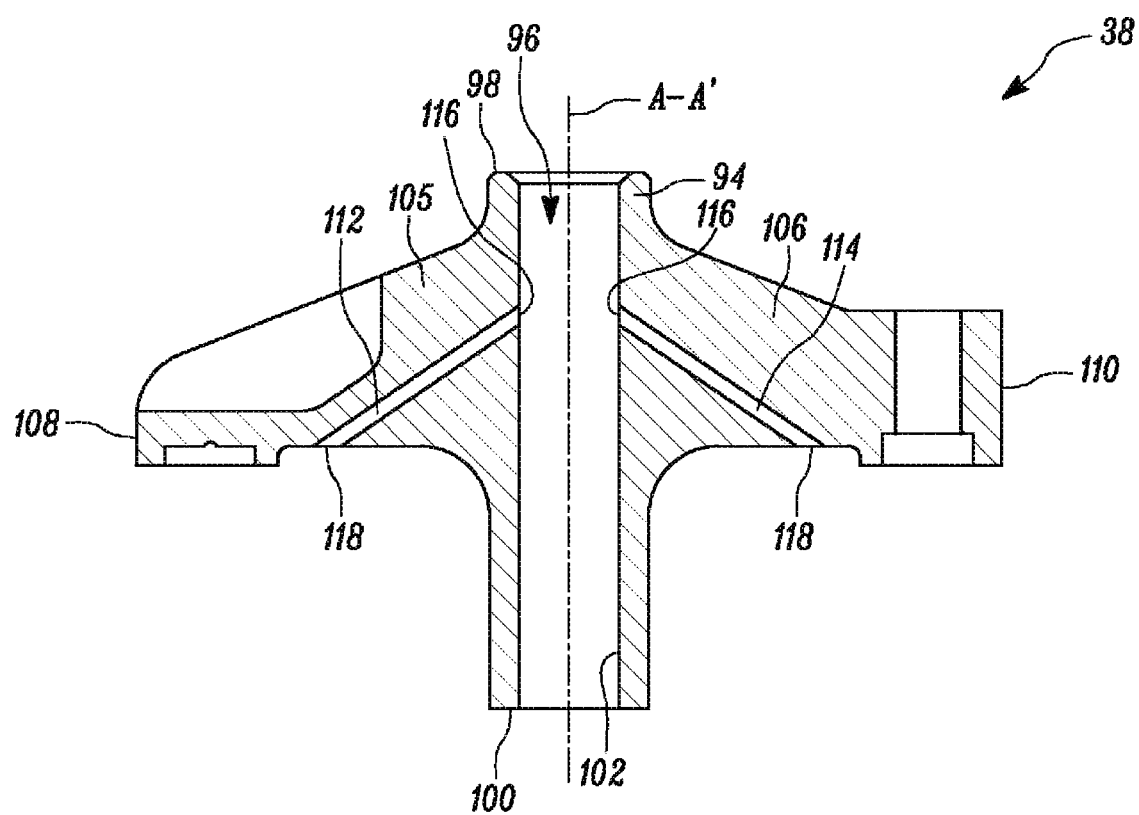
FIG. 3 is a cross-sectional view of a valve bridge associated with the system for lubricating the valve assembly.

FIG. 3 illustrates a cross-sectional view of the valve bridge 38. The valve bridge 38 includes a base portion 94 defining a central axis A-A'. The base portion 94 includes a hole 96 extending along the central axis A-A'. In an example, the base portion 94 may be a cylindrical body having a first end 98 and a second end 100. The hole 96 has an inner surface 102 extending between the first and second ends 98, 100 of the base portion 94. The first end 98 of the base portion 94 is coupled with the plunger 42. The second end 100 of the base portion 94 is coupled to the guide rod 54. Specifically, the hole 96 slidably and partially receives the guide rod 54 therein such that the inner surface 102 of the hole 96 and the second end 58 of the guide rod 54 define a chamber 104 (shown in FIG. 2). The chamber 104 receives the lubricant from the rocker arm 30 via the passages 40 and 41 during operation of the engine 10. A volume of the chamber 104 may vary based on the linear motion of the valve bridge 38 along the guide rod 54. Due to change in the volume of the chamber 104, pressure of the lubricant present in the chamber 104 may also vary.

The valve bridge 38 further includes a first arm 105 and a second arm 106. The first and second arms 105, 106 extend radially from the base portion 94. The first arm 105 and the second arm 106 include a first end 108 and a second end 110, respectively. The first end 108 of the first and second arms 105, 106 is connected to the base portion 94. The second end 110 is distal from the first end 94. The first and second ends 108, 110 are adapted to engage with the first and second exhaust valves 44, 46, respectively. More specifically, the first end 108 of the first arm 105 is engaged with the first end 76 of the valve stem 72 of the first exhaust valve 44. Similarly, the second end 110 of the second arm 106 is engaged with a valve stem 72 of the second exhaust valve 46. The valve bridge 38 includes a first passage 112 defined in the first arm 105 and a second passage 114 defined in the second arm 106. The first and the second passages 112, 114 are adapted to supply the lubricant to the first and second exhaust valves 44, 46, respectively. Further, the first and second passages 112, 114 are adapted to supply the lubricant to the outer surface 92 of the valve stems 72. Each of the first and second passages 112, 114 includes a first end 116 and a second end 118. The first end 116 of the first and second passages 112, 114 is in fluid communication with the chamber 104 defined in the base portion 94. The second end 118 of the first and second passages 112, 114 is defined adjacent to the first and second ends 108, 110, respectively, thereof. In one example, each of the first and second passages 112, 114 may have an inner diameter constant throughout a length thereof. In another example, the inner diameter of each of the first and second passages 112, 114 may vary between the first and second ends 116, 118.

Figure 4:
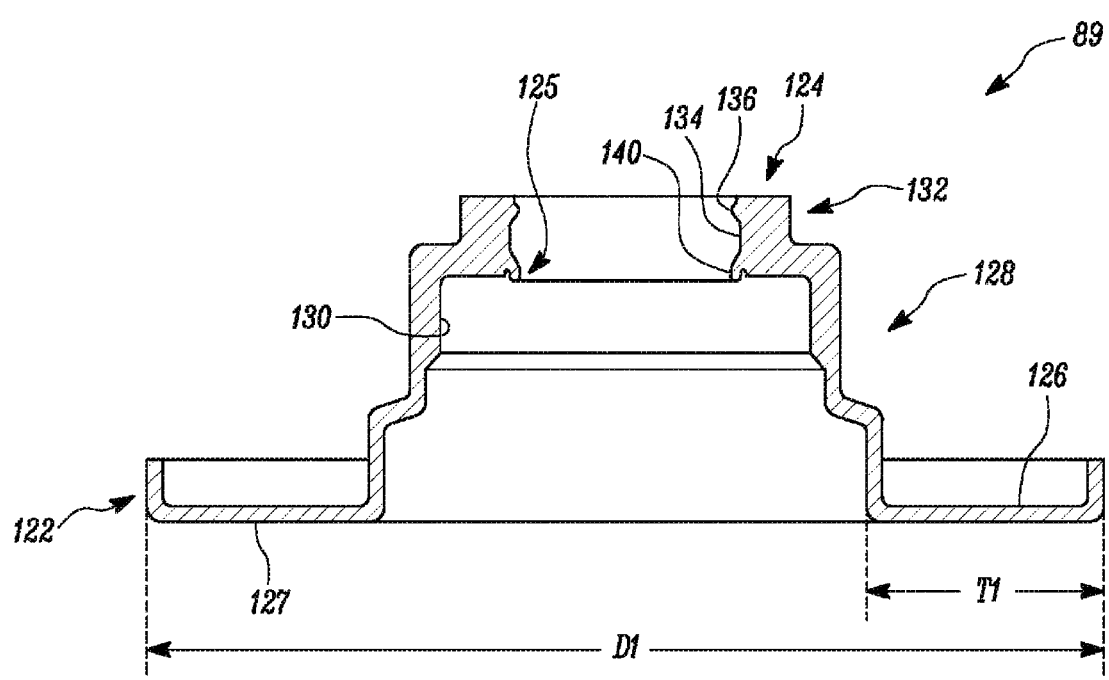
FIG. 4 is a cross-sectional view of a valve seal associated with the system for lubricating the valve assembly.

FIG. 4 illustrates a cross-sectional view of the valve seal 89. In the present embodiment, the valve seal 89 is a hollow cylindrical body having various diametric portions defined between a first end 122 and a second end 124. The valve seal 89 includes a first portion 126 defined at the first end 122 and adapted to abut the cylinder head 18. More specifically, the first portion 126 has a radial thickness 'T1' and defines an abutment surface 127 to contact with the upper surface 70 of the cylinder head 18. The radial thickness 'T1' is defined in such a way that an outer diameter 'D1' defined by the first portion 126 is greater than an outer diameter defined by the coil spring 48. Hence, the second end 88 of the coil spring 48 may be rested against the first portion 126 of the valve seal 89 (shown in FIG. 2). The valve seal 89 further includes a second portion 128 that extends from the first portion 126. The second portion 128 of the valve seal 89 has an outer diameter that is less than an inner diameter of the coil spring 48 such that the coil spring 48 is disposed around the second portion 128. The second portion 128 has a first inner surface 130 adapted to engage with an outer surface defining an inner diameter greater than or equal to an outer diameter of the valve stem guide 66. The valve seal 89 further includes a third portion 132 having an axial thickness 'T2' defined between the first end 122 and the second end 124 of the valve seal 89. More specifically, the axial thickness 'T2' is defined between the second end 124 and an intermediate end 125. The third portion 132 further includes a second inner surface 134 extending between the second end 124 and the intermediate end 125. An inner diameter defined by the second inner surface 134 of the third portion 132 is greater than an outer diameter of the valve stem 72. The third portion 132 includes a first lip member 136 extending radially from the second inner surface 134. The first lip member 136 is defined adjacent to the second end 124 of the valve seal 89. The first lip member 136 extends radially from the second inner surface 134, and adapted to engage with the outer surface 92 of the valve stem 72. In an example, the first lip member 136 may have a triangular cross section. The second inner surface 134 further includes a second lip member 140 defined adjacent to the intermediate end 125 of the third portion 132. The second lip member 140 extends radially from the second inner surface 134 of the third portion 132. In an example, the second lip member 140 may extend at an angle from the second inner surface 134 towards the first end 122 of the valve seal 89.

Figure 5:
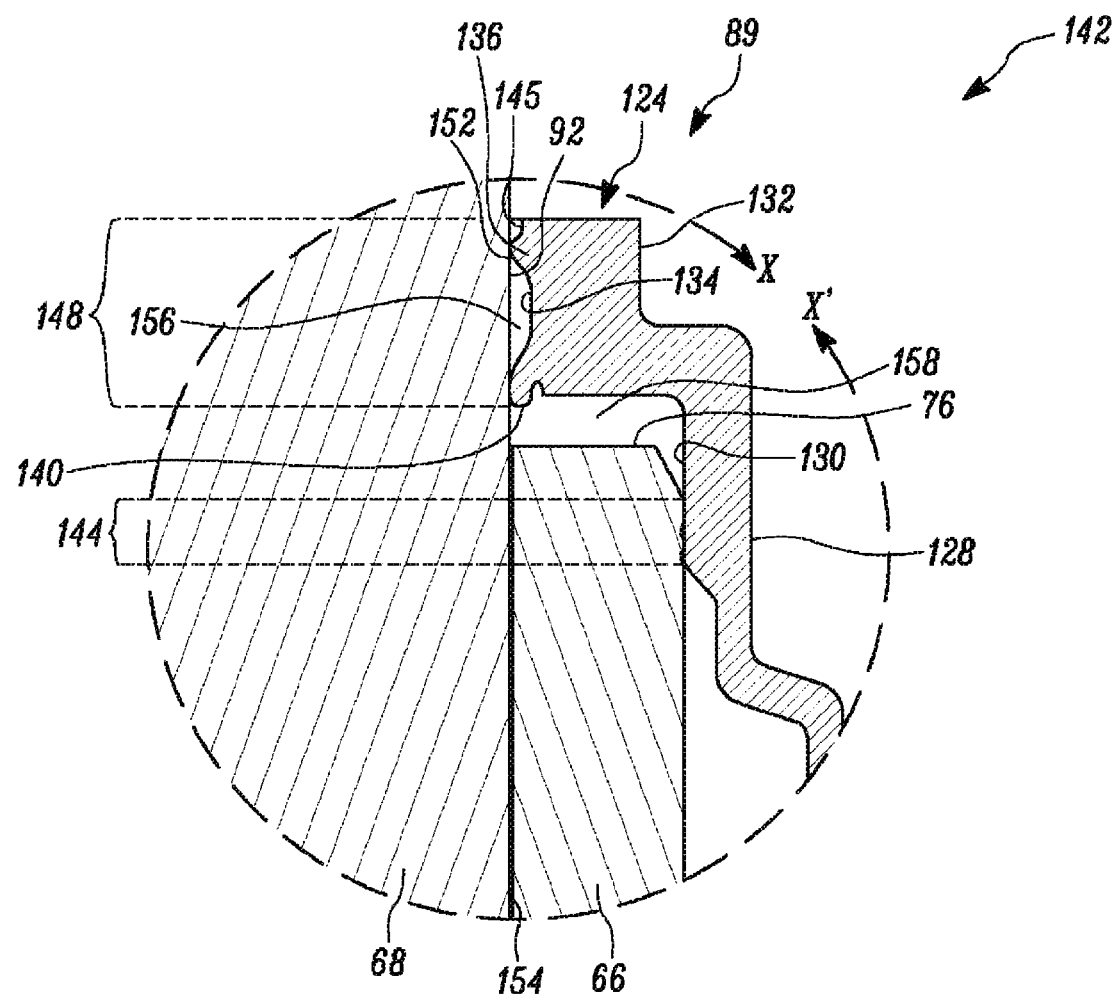
FIG. 5 is an enlarged view of a section X-X' of FIG. 2 showing an assembly of the valve seal with a valve stem of the valve assembly.

FIG. 5 shows an enlarged view of section X-X' of FIG. 2 illustrating an assembly 142 of the valve seal 89 with the valve stem 72. The second portion 128 is disposed around a portion 144 of the first end 76 of the valve stem guide 66. More specifically, the first inner surface 130 of the second portion 128 abuts the outer surface of the portion 144 of the valve stem guide 66. The first and second lip members 136, 140 of the third portion 132 are contacting the outer surface 92 of a portion 148 of the valve stem 72.

In an assembled condition of the valve seal 89 and the valve stem 72, the first lip member 136 and the second inner surface 134 of the third portion 132 define a space 156 to collect the lubricant coming from the first passage 112. In an example, the first lip member 136 has a planar portion 152 with a predefined length, so as to provide a gripping surface for contacting the valve stem 72. The second lip member 140 has contact surface with a predefined length. The valve seal 89 further defines a gap 154 with the valve stem 72 and the valve stem guide 66.

During operation of the engine 10, the lubricant from the rocker arm 30 is supplied to the valve bridge 38 from the first end 98. The lubricant is filled within the chamber 104. During, start of a valve actuation event of the combustion process, the rocker arm 30 pushes the valve bridge 38 downward. The valve bridge 38 pushes the first and second exhaust valves 44, 46 downward. Simultaneously, the valve bridge 38 slides against the guide rod 54, which pumps the lubricant through the first and second passages 112, 114. The lubricant gets collected in the cavity 90 between the spring retainer 86 and the valve stem 72. The lubricant from the chamber 104 flows downward along the outer surface 92 of valve stem 72 and gets collected in the gap 145. A certain amount of the lubricant gets adsorbed by the valve stem 72. The valve stem 72 further slides about the valve seal 89 and the valve stem guide 66. The first lip member 136 of the valve seal 89 allows the adsorbed lubricant to pass through them towards the second portion 128 of the valve seal 89. Certain amount of the lubricant is then collected in a space 156 defined between the first lip member 136 and the second lip member 140. The second lip member 140 further controls the flow of lubricant towards the second portion 128 of the valve seal 89 and the valve stem guide 66. An amount of the lubricant passing the second lip member 140 may be controlled based on the predefined length of the contact surface and a force at which the outer surface 92 of the valve stem 72 engages with the second lip member 140. Certain amount of the lubricant may be collected in a space 158 defined between the valve stem guide 66, the valve stem 72 and the second portion 128 of the valve seal 89.

When the valve actuation event ends, the valve stein 72 moves upward due to the biasing force of the coil spring 48. During the upward movement of the valve stem 72, the lubricant through the second lip member 140 gets controlled or retained by the second lip member 140. Such controlling of the flow of the lubricant is caused due to the force at which the outer surface 92 of the valve stem 72 engages with the second lip member 140 during upward movement and downward movement of the valve stem 72. For an example, a force at which the valve stem 72 engages with the second lip member 140 during upward movement may be greater than a force at which the valve stem 72 engages with the second lip member 140 during downward movement. Thus, the lubricant gets collected in the gap 154 between the valve stem 72 and the valve stem guide 66. Thus, the first lip member 136 and the second lip member 140 controls the flow of the lubricant from the first and second passages 112, 114 to the gap 154 defined between the valve stem 72 and the valve stem guide 66.

INDUSTRIAL APPLICABILITY

The present disclosure relates to the system 50 for lubricating the valve assembly 12. The valve bridge 38 of the valve assembly 12 receives the lubrication within the chamber 104. When the valve bridge 38 moves downward about the guide rod 54 during a valve actuation event, the lubricant from the chamber 104 flows from the first end 116 to the second end 118 of each of the first and second passages 112, 114. The first and second passages 112, 114 are defined in the valve bridge 38 in such a way that the lubricant from the second end 118 is supplied towards the first and second exhaust valves 44, 46 respectively. The lubricant gets collected in the cavity 90 between the outer surface 92 of the valve stem 72 and the spring retainer 86. The lubricant thus collected flows longitudinally along the outer surface 92 of the valve stem 72. This ensures adequate lubricant supply to the valve stem 72 of each of the first and second exhaust valves 44, 46.

When the valve actuation event ends, the valve stem 72 moves upward and the lubricant gets retained by the second lip member 140 in the gap 154 between the valve seal 89, the valve stem 72 and the valve stem guide 66. Such controlling of the flow of the lubricant is caused due to the force at which the outer surface 92 of the valve stem 72 engages with the second lip member 140 during upward movement and downward movement of the valve stem 72. For an example, a force at which the valve stem 72 engages with the second lip member 140 during upward movement may be greater than a force at which the valve stem 72 engages with the second lip member 140 during downward movement. Thus, the lubricant gets collected in the gap 154 between the valve stem 72 and the valve stem guide 66. Thus, the first lip member 136 and the second lip member 140 controls the flow of the lubricant from the first and second passages 112, 114 to the gap 154 defined between the valve stem 72 and the valve stem guide 66. With the present disclosure, the first lip member 136, the second lip member 140 and the lubricant collected in the gap 154 ensures availability of the lubricant in the gap between the valve stem 72 and the valve stem guide 66 at any operating condition of the engine 10, such as at high intake manifold pressure condition, which would otherwise cause less lubrication between the valve stem 72 and the valve stem guide 66 and thereby cause premature failure of the valve stem 72 and the valve stem guide 66.

What is claimed is:

1. A system for lubricating a valve assembly of an engine, the engine including a cylinder head to receive a valve stem, the system comprising:

a valve bridge, the valve bridge including:

a base portion defining a chamber to receive a lubricant;

at least one arm extending radially from the base portion, and adapted to engage with the valve stem; and a passage in the arm and in fluid communication with the chamber and adapted to supply lubricant to an outer surface of the valve stem; and a valve seal disposed around the valve stem and a valve stem guide, the valve seal adapted to control a flow of the lubricant to a gap defined between the valve stem and the valve stem guide; and the valve seal includes a first portion adapted to abut the cylinder head; a second portion extending longitudinally from the first portion, and disposed around a portion of the valve stem guide; and a third portion extending from the second portion, and disposed around a portion of the at least one valve stem, the third portion including at least one lip member adapted to abut the outer surface of the valve stem.

* * * * *